March 25, 1969

F. REGGIA 3,435,383

NONDISPERSIVE ELECTRICALLY VARIABLE MICROWAVE ACOUSTIC DELAY
LINE COMPRISING A FERRITE FARADAY ROTATOR COUPLED
TO AN ANISOTROPIC PIEZOELECTRIC CRYSTAL
Filed Feb. 27, 1967

INVENTOR,
FRANK REGGIA

United States Patent Office 3,435,383
Patented Mar. 25, 1969

3,435,383
NONDISPERSIVE ELECTRICALLY VARIABLE MICROWAVE ACOUSTIC DELAY LINE COMPRISING A FERRITE FARADAY ROTATOR COUPLED TO AN ANISOTROPIC PIEZOELECTRIC CRYSTAL
Frank Reggia, Bethesda, Md., assignor to the United States of America as represented by the Secretary of the Army
Filed Feb. 27, 1967, Ser. No. 619,539
Int. Cl. H03h 7/30
U.S. Cl. 333—31                       2 Claims

ABSTRACT OF THE DISCLOSURE

This disclosure describes a nondispersive electrically variable acoustic delay line for microwave energy. The delay line disclosed comprises a ferrite Faraday rotator coupled to a piezoelectric single crystal having anisotropic properties. The Faraday rotator changes the polarization direction of a microwave signal by an amount proportional to the current flowing in the rotator solenoid from an external source. The velocity of propagation of an acoustic wave induced in the piezoelectric delay medium by the microwave energy incident thereon is determined by a polarization direction of the microwave energy. Therefore, by changing the amount of current flowing in the control winding of the Faraday rotator the velocity of propagation through the piezoelectric medium will be altered.

Background of the invention

At the present time in the microwave arts there exist no satisfactory nondispersive variable delay lines that are simple, inexpensive, lightweight and not space consuming. A major application for such a device would be in radar systems where often it is desired to compare the transmitted signal with the target return signal. In that case, it is necessary to delay a sample of the transmitted signal by an amount of time equal to that required for the transmitted signal to travel to the target and return to the receiver. In presently used radar systems it is necessary to use fixed delay lines or elaborate mixing systems. If fixed delay lines are used it is necessary to substitute appropriate delay lines as necessary to accommodate changes in the distance to the target. To overcome this problem, sophisticated mixing systems have been designed but these are relatively expensive, complicated and bulky. While the problem of the lack of satisfactory variable microwave delay lines has been discussed in the context of radar systems, it must be recognized that the need exists in other areas of the microwave arts such as computers in which it is necessary to vary sampling times or to vary the repetition rate of high frequency signals.

It is therefore an object of this invention to provide a continuously variable nondispersive delay line for use at the microwave frequencies which is simple, inexpensive, lightweight and requires little space.

Another object of this invention is to provide an improved continuously variable delay line, that is, electrically variable.

Summary of the invention

The above and other objects may be attained by utilizing that anisotropic property of a piezoelectric material which causes the velocity of propagation of an acoustic wave through the crystal to change depending on the polarization of the microwave energy incident upon it. The polarization direction of the exciting electromagnetic wave determines the acoustic mode propagating in the delay medium. Therefore, by using a Faraday rotator immediately preceding a single-crystal piezoelectric material it is possible to electrically change the polarization direction of the electromagnetic wave thereby changing the velocity of propagation of an acoustic wave through a delay medium.

Description of a typical embodiment

It is known in the art that anisotropic (single crystal) piezoelectric materials have the property that when excited by an electromagnetic wave an acoustic wave will be propagated through the crystal and at a velocity that is a function of the polarization direction of the electromagnetic wave incident upon the crystal. This characteristic is illustrated by a paper by N. F. Foster appearing in volume 53, No. 10 Proceedings of the IEEE, entitled "Cadmium Sulfide Evaporated Layer Transducer."

Figure 1:
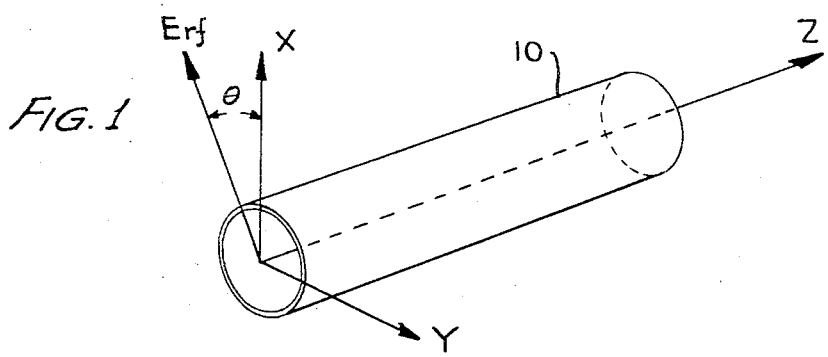
FIGURE 1 is a perspective view of a typical embodiment of anisotropic piezoelectric material used in my invention.

In FIGURE 1 is shown a single crystal (anisotropic medium) piezoelectric crystal 10 such as quartz or lithium metaniobate as would be used in my invention. The vector $E_{rf}$ indicates the polarization direction of the microwave signal incident upon crystal 10. The boundary area of the piezoelectric crystal 10 as is well known will act as a transducer converting the incident electromagnetic wave to an elastic wave. The velocity $V_z$ at which a shear wave will be propagated through the crystal along its z-axis may be represented by the following relation:

$$V_z = KF(\theta)$$

where:

$V_z =$ velocity of a shear wave through the crystal along its z-axis,
$K =$ a constant of the particular material used, and
$F(\theta) =$ a function of the angle $\theta$.

Figure 2:
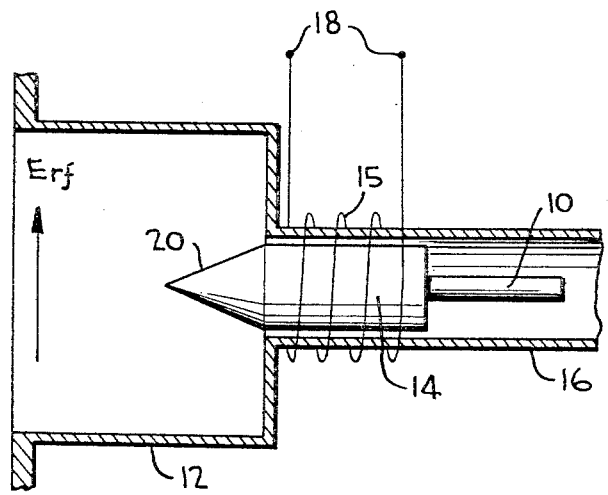
FIGURE 2 is a cross sectional view of a typical embodiment of the delay line of my invention.

In order to take advantage of the variable delay property of anisotropic piezoelectric materials my invention, a typical embodiment of which is shown in FIGURE 2, provides a Faraday rotator in conjunction with the piezoelectric material in order to rotate the polarization direction of the incident electromagnetic wave to produce a desired amount of delay. Faraday rotators commonly employ a section of round waveguide having an axially mounted ferrite element with a magnetizing coil wound around the waveguide creating a longitudinal magnetic field in the ferrite element when current flows through the coil. If the longitudinal field is applied to a ferrite rod inside an axially symmetrical waveguide system excited with a linear wave, a rotation of the plane of polarization of a microwave energy by an amount proportional to the current flowing in the coil occurs. In the embodiment of FIGURE 2 the microwave energy is incident upon the delay line of my invention through a rectangular waveguide 12, dimensioned to permit propagation of only the $TE_{01}$ mode. Waveguide 12 is attached to a cylindrical waveguide section 16. Ferrite rod 14 is axially symmetrically positioned within waveguide 16 with a taper 20 protruding into waveguide 12 to provide an impedance match between the two sections. Magnetizing coil 15 with terminals 18 is wound around that section of waveguide 16 in which the ferrite rod 14 is placed. An anisotropic piezoelectric crystal 10 is bonded to the end opposite taper 20 of ferrite rod 14. By attaching a current source to terminals 18 and causing a current to flow through magnetizing coil 15 a longitudinal magnetic field is created in ferrite rod 14 which causes the plane of polarization of the microwave energy incident upon waveguide 16 from waveguide 12 to rotate. The amount of rotation of course being proportional to the amount of current caused to flow in magnetizing coil 15. The angular orientation of the microwave energy incident upon crystal 10 will then determine the velocity of propagation of an elastic wave through the piezoelectric delay medium as discussed with reference to FIGURE 1. Therefore, by adjusting the polarization direction of the microwave energy incident on crystal 10 the desired amount of delay may be obtained.

The typical embodiment of FIGURE 2 is designed to operate in X-band (9–10 gHz.) with rectangular waveguide section 12 having 0.4 by 0.9 inch dimensions and cylindrical waveguide section 16 having an inside diameter of ¼-inch. The ferrite 14 is a MgMn rod having a ¼-inch diameter and a total length of less than 1 and one half inches. The taper 20 is generally less than ¾ inch. The piezoelectric delay medium may be of quartz, LiNbO$_3$ or their equivalents with a diameter of less than or equal to 0.100 inch. For a delay of 2 microseconds, it will be necessary for crystal 10 to be approximately ½ inch in length. The microwave acoustic delay time $T_d$ introduced by a particular piezoelectric material may be computed from the following relation:

$$T_d = 2L/v_a$$

where:

L = length of piezoelectric crystal, and
$v_a$ = the acoustic velocity for the materials used.

It will be apparent to those skilled in the art that the embodiment shown is only exemplary and that various modifications can be made in construction and arrangement within the scope of the invention as defined in the appended claims.

I claim as my invention:

1. A nondispersive electrically variable delay line for microwave signals comprising:
   (a) a means for rotating the polarization direction of a microwave signal, and
   (b) a piezoelectric nondispersive delay medium adapted to receive said microwave signal from said means and to have an elastic wave induced therein and having the property that the velocity of propagation through said delay medium will be determined by the polarization direction of said microwave signal.

2. The electrically variable delay line for microwave signals of claim 1 in which said means for rotating the polarization direction of a microwave signal is a ferrite Faraday rotator.

References Cited

UNITED STATES PATENTS 3,166,724  1/1965  Allen _____ 333—31 X

HERMAN KARL SAALBACH, *Primary Examiner.*

T. J. VEZEAN, *Assistant Examiner.*

U.S. Cl. X.R.

333—24.3